Dec. 2, 1969     H. LUTZ     3,481,157
UNIVERSAL JOINT
Filed Sept. 25, 1967
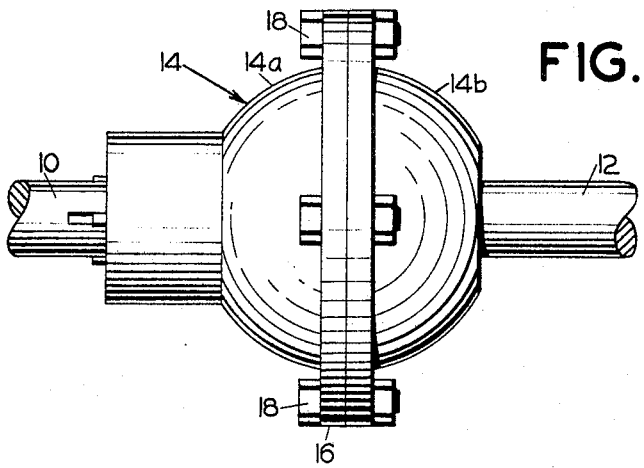
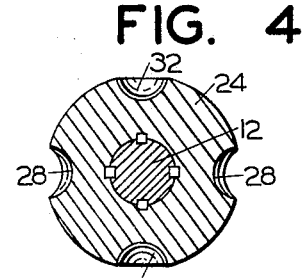
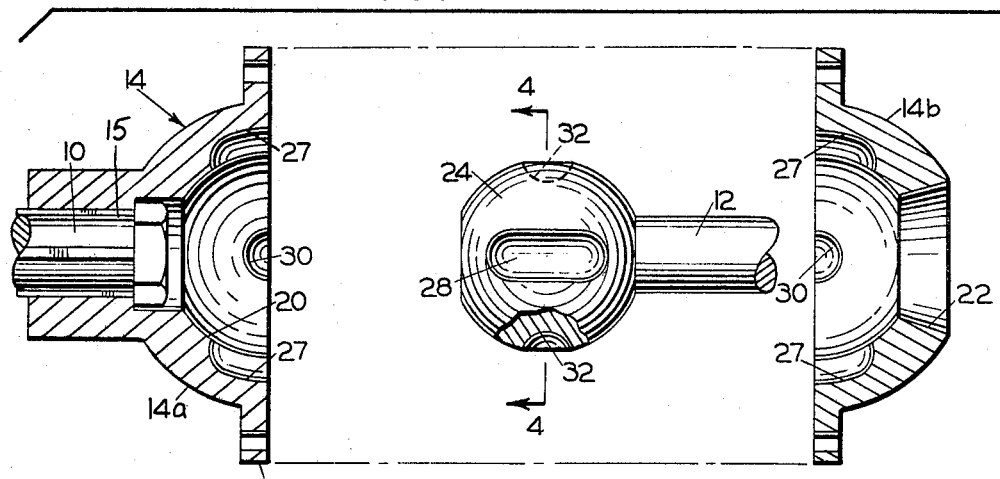
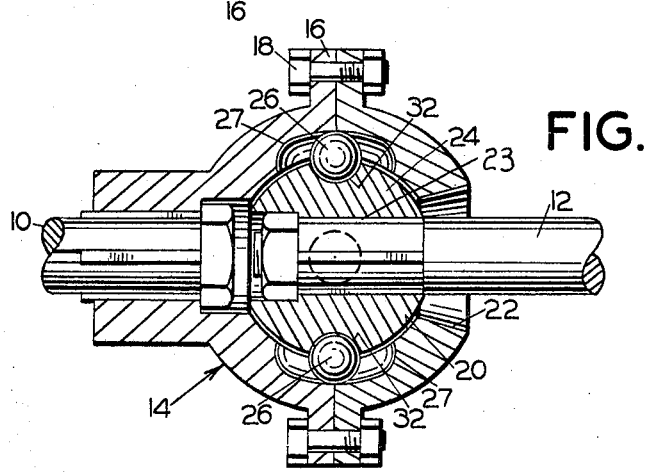
INVENTOR.
HELMUT LUTZ
BY Eugene M. Eckelman
ATTORNEY

United States Patent Office 3,481,157
Patented Dec. 2, 1969

3,481,157
UNIVERSAL JOINT
Helmut Lutz, 15712 SE. Madison Court,
Portland, Oreg. 97233
Filed Sept. 25, 1967, Ser. No. 670,117
Int. Cl. F16d 3/24
U.S. Cl. 64—7       1 Claim

ABSTRACT OF THE DISCLOSURE

The universal joint of the invention is intended to provide a coupling between two shaft portions. A first shaft portion has a housing on one of its ends and the other shaft portion has a spherical ball member on one of its ends. The housing has an inner surface of the socket has a pair of grooves disposed in diametrical opposite relation, and the ball end similarly has a pair of surface grooves disposed in opposite diametrical relation. These grooves extend longitudinally relative their respective shafts. Associated with each of the four grooves is a recess in the opposing member. Seated in the recess and working in the grooves are anti-friction balls providing a coupling between the two members which permits angular variations between the shafts.

Background of the invention

This invention relates to new and useful improvements in a ball type universal joint.

Ball type universal joints have heretofore been in use. Such joints include an outer housing on one shaft portion and a ball end on another shaft portion enclosed within the housing and connected thereto by anti-friction balls. Such prior universal joints have not achieved commercial success because their structures have been complex and furthermore it has not been possible to provide a construction capable of transmitting the required torsional drive due to a weakening effect caused by the ball and socket structure. Applicant has a primary objective of his invention to provide a ball type universal joint which overcomes the disadvantages of the prior art in that it is relatively simple in construction and in addition is sufficiently rugged to transmit great torsional drive without failure of the parts.

Another objection is to provide a ball type universal joint having novel connecting means between a housing and ball end comprising cooperating pairs of elongated grooves and socket-type recesses in the respective members to receive anti-friction drive connecting balls, the grooves and recesses being disposed in diametrically opposite relation and being equidistantly spaced at 90° around the housing and ball end with the grooves and recesses in the respective housing and ball end being disposed alternately therearound.

Brief description of the drawings

FIGURE 1 is a side elevational view of the present universal joint in assembled relation;

FIGURE 2 is a central sectional view of the universal joint;

FIGURE 3 is an exploded view partly in section and partly broken away to further show internal structure; and FIGURE 4 is a cross sectional view of a ball end of the universal joint.

Description of the preferred embodiment

With particular reference to the drawings, the present universal joint is adapted to effect a coupling between a pair of shafts 10 and 12. One of these shafts may be considered to be the driving shaft and the other the driven shaft. Shaft 10 has a housing 14 on one end thereof, and such housing is formed in two parts 14a and 14b. Part 14a is connected to the shaft 10 by a spline connection 15 and part 14b is secured to part 14a by means of flanges 16 on the housing parts bolted together by bolts 18.

The interior of housing 14 comprises a socket or seat 20 which is spherical in shape, and opening through one wall of the housing opposite from and axially aligned with the shaft 10 is an aperture 22 for receiving the shaft 12.

Shaft 12 has a spline connection 23 with a ball end 24 which in the assembled relation of the universal joint is contained in the socket 20. A small clearance is provided between the socket 20 and the ball 24 to provide free adjustment of the ball end within socket in any direction. Aperture 22 is of sufficient diameter to allow the necessary angular variation of the shaft 12 in a universal coupling. The size of such aperture may vary according to the angular variation required between the shafts.

The universal connection between the housing 14 and the ball end 24 is accomplished by four anti-friction balls 26 disposed at 90° intervals around the transverse circumference of the ball end. More particularly, the socket 20 has a pair of diametrically opposed arcuate grooves 27 which extend longitudinally in a plane passing through the axis of the shaft 10 and which have sufficient length to permit enough travel of the anti-friction balls 26 therein to accomplish the universal movement required. For this purpose the grooves 27 extend on opposite sides of the transverse medial diameter of the socket 20. Likewise, ball end 24 of the shaft 12 has a pair of grooves 28 disposed in diametrically opposed relation which extend longitudinally in a plane passing through the axis of shaft 12. Such grooves are sufficiently elongated also to permit enough travel of the anti-friction balls therein to accomplish the required universal movement of the shaft 12 with relation to shaft 10.

A pair of diametrically opposed recesses or seats 30 are provided in the surface of socket 20, such diametrically opposed recesses being located precisely in a plane normal to the grooves 27, or in other words these recesses are spaced circumferentially in the socket 20 at a point half-way between the grooves 27. Recesses 30 are of a size to hold the anti-friction balls 26 in a fixed but rotatable position. The anti-friction balls in the recesses 30 project into the grooves 28 of the ball end 14 in the assembled position of the universal. Ball end 24 has a pair of diametrically opposed recesses 32 located precisely half-way between the grooves 28 so that the ball end has alternate grooves 28 and recesses 32 spaced 90° apart. Anti-friction balls 26 are held in the recesses 32 in a fixed but rotatable position and project into grooves 27 in the socket 20.

The recesses 30 and 32 are of substantially the same radius of curvature as the anti-friction balls, and the grooves 27 and 28 are of a width substantially the same as the breadth of that portion of the anti-friction balls which is in engagement therewith. Thus, the anti-friction balls provide a drive connection between the housing 14 and the ball end 24, and since the balls 26 can work in the grooves 27 and 28, a universal connection is provided.

The universal connection provided between the two shafts and the connecting means thereof, comprising the anti-friction balls and the arrangement of grooves and recesses, is such that it has a minimum of cut-out or weakened areas. The joint is thus rugged in use in relation to the metal thickness used. Since the anti-friction balls are held in place by the respective recesses 30 and 32 the connection between the parts will always be centered for maximum strength. The present universal also is simplified in construction and therefore economical to manufacture.

It is to be understood that the form of my invention herein shown and described is to be taken as a preferred example of the same and that various changes in the shape, size and arrangement of parts may be resorted to without departing from the spirit of my invention.

Having thus described my invention I claim:

1. A universal joint comprising a pair of shafts between which rotational movement is to be transmitted despite angular variations therebetween, comprising a housing mounted on the end of one of the shafts, said housing being laterally split in two parts with said parts being detachably boltable together, a substantially spherical ball portion on one end of the other shaft, said ball portion having a central bore whereby to slidably receive and be mounted on said other shaft, said ball portion having a key connection with said other shaft for providing rotation therewith, a portion of said other shaft adjacent its end having screw threads for receiving a nut which holds said ball portion on its shaft, means defining a socket in an end of the ball portion for receiving said nut, said housing having an outer defining wall with an inner surface on said wall forming a spherical socket rotatably receiving said ball portion, means defining an opening in said housing wall of less cross dimension than said ball portion to connect the latter in said housing but larger than the shaft for the ball portion to permit angular adjustment of one shaft relative to another in any lateral direction, means provided directly in the inner surface of said housing wall forming a pair of diametrically opposed grooves extending longitudinally relative to said shaft on which said housing is mounted, means in the outer surface of said ball portion forming a pair of diametrically opposed grooves extending longitudinally relative to the shaft on which said ball portion is mounted, each of the grooves in said housing and ball portion being of less length than their respective housing and ball portion whereby to have closed ends, means in each of said inner wall of said housing and the surface of said ball portion forming recesses cooperating with respective ones of said grooves in the other of said housing and said ball portion, said grooves in the surface of said ball portion being located 90 degrees from said grooves in the inner surface of said housing whereby said grooves and recesses in the respective housing and ball portion are disposed alternately therearound, and anti-friction balls seated in each of said recesses and projecting into said coperating grooves providing a universal connection between said shafts.

References Cited

UNITED STATES PATENTS

| | | | |
|---|---|---|---|
| 1,305,259 | 6/1919 | Dunkinson | 64—7 |
| 1,463,306 | 7/1923 | Bushnell | 64—7 |
| 2,033,583 | 3/1936 | McCarrell | 64—7 X |

HALL C. COE, Primary Examiner